United States Patent
Lim et al.

(10) Patent No.: US 8,155,080 B2
(45) Date of Patent: Apr. 10, 2012

(54) MEDIA INDEPENDENT HANDOVER-BASED NETWORK SYSTEM HAVING A VERTICAL HANDOVER CAPABILITY AND VERTICAL HANDOVER METHOD THEREOF

(75) Inventors: Wan Seon Lim, Pohang-shi (KR); Joo Young Baek, Pohang-shi (KR); Woo Jae Kim, Pohang-shi (KR); Young Joo Suh, Pohang-shi (KR)

(73) Assignee: Postech Academy-Industry Foundation, Pohang-Shi, Kyungsangbuk-Do (KR)

( * ) Notice: Subject to any disclaimer, the term of this patent is extended or adjusted under 35 U.S.C. 154(b) by 946 days.

(21) Appl. No.: 12/081,527

(22) Filed: Apr. 17, 2008

(65) Prior Publication Data
US 2008/0259872 A1    Oct. 23, 2008

(30) Foreign Application Priority Data
Apr. 20, 2007   (KR) .................. 10-2007-0038812

(51) Int. Cl.
*H04B 4/00* (2006.01)
(52) U.S. Cl. ...................... 370/331; 370/328
(58) Field of Classification Search ............ 370/331
See application file for complete search history.

(56) References Cited

U.S. PATENT DOCUMENTS

| | | | |
|---|---|---|---|
| 7,269,166 B2* | 9/2007 | Koskiahde et al. | 370/352 |
| 7,710,924 B2* | 5/2010 | Kim et al. | 370/331 |
| 2004/0246939 A1* | 12/2004 | Koskiahde et al. | 370/351 |
| 2005/0020265 A1* | 1/2005 | Funabiki et al. | 455/436 |
| 2006/0129630 A1* | 6/2006 | Catalina-Gallego et al. | 709/203 |
| 2006/0140150 A1 | 6/2006 | Olvera-Hernandez et al. | |
| 2006/0166699 A1* | 7/2006 | Aghvami et al. | 455/552.1 |
| 2006/0274697 A1* | 12/2006 | Kim et al. | 370/331 |
| 2007/0091822 A1* | 4/2007 | Do et al. | 370/254 |
| 2008/0064402 A1* | 3/2008 | Oh | 455/436 |
| 2009/0303962 A1* | 12/2009 | Jokikyyny et al. | 370/331 |
| 2010/0150110 A1* | 6/2010 | Dutta et al. | 370/331 |

FOREIGN PATENT DOCUMENTS

| | | |
|---|---|---|
| KR | 2006-127754 | 12/2006 |
| WO | 2007/022301 | 2/2007 |

OTHER PUBLICATIONS

Joo-Young Baek et al. "Handover Functional Architecture for Next Generation Wireless Networks", Korean Institute of Information Scientists and Engineers, Autumn Paper of 2006, vol. 33 No. 2 (D), 2006, pp. 268-273.
Yoon Young An et al: "Reduction of Handover Latency Using MIH Services in MIPv6", Apr. 18, 2006, XP010915366.
Qazi Bouland Mussabbir et al: "Optimized FMIPv6 Handover using IEEE802.21 MIH Services", Dec. 1, 2006, XP007905499.

* cited by examiner

*Primary Examiner* — Jeffrey Pwu
*Assistant Examiner* — Gerald Smarth
(74) *Attorney, Agent, or Firm* — Bacon & Thomas, PLLC

(57) ABSTRACT

A heterogeneous network system performs a vertical handover based on media independent handover (MIH) in different networks in which a WiMAX (Wireless Broadband Internet) network (or a WiBro (Wireless Broadband Internet)) and a WLAN (Wireless LAN) network are coexisted. The heterogeneous network system cyclically acquires neighboring network information in advance through a media independent handover server, and performs new address (NCoA) generation at a handover preliminary time. And then DAD (Duplicate Address Detection) and BU (Binding Update) are performed. Accordingly, the vertical handover between different networks can be performed to receive packets from a switched network while a handover delay time is minimized.

4 Claims, 4 Drawing Sheets

MEDIA INDEPENDENT HANDOVER-BASED NETWORK SYSTEM HAVING A VERTICAL HANDOVER CAPABILITY AND VERTICAL HANDOVER METHOD THEREOF

FIELD OF THE INVENTION

The present invention relates to a vertical handover technique in a heterogeneous network system. More particularly, the present invention relates to a heterogeneous network system which is suitable for a vertical handover based on media independent handover (MIH) in different networks in which a WiMAX (Worldwide Interoperability for Microwave Access) network (or a WiBro (Wireless Broadband Internet)) network and a WLAN (Wireless LAN) network are coexisted, and a vertical handover method thereof.

BACKGROUND OF THE INVENTION

As well known in the art, as a wireless network is increasingly demanded, various wireless technologies, such as, WiMAX (or WiBro), WLAN, and the like, have been developed. Accordingly, a multi mode terminal (MMT) that has an interface for supporting two or more wireless technologies is used for communication in a heterogeneous network system.

In particular, for communication in the heterogeneous network system, vertical handover between different networks needs to be stably and seamlessly performed. The vertical handover is a next-generation network concept against a horizontal handover. In a 4G (4-Generation) network in which different radio access technologies coexist, it has been recognized that the vertical handover is an important factor for efficiently utilizing the network resources. The vertical handover should have the following features: first, an existing operation should be maintained regardless of a radio access network, which is used at a lower part in an upper layer, such as an application; and second, seamless mobility should be supported to provide a user with seamless services.

For the vertical handover, the standardization of the mobile IP (Internet Protocol) is in progress by the IETF (Internet Engineering Task Force) working group. When the 4G network is expanded to an all-IP network, since the vertical handover also operates based on the mobile IP, the vertical handover between different networks is attracting attention.

Considering the vertical handover between a 3G network and a WLAN network, the 3G network can provide wide cell coverage and user's mobility. However, it has a low data transfer rate due to small bandwidth, and hence a better service suitable for a fast network is rarely provided.

In case of the WLAN network, although fast data communication can be performed enough to support data communication at 54 Mbps, the size of cell coverage is small, and the user's mobility is not effectively provided. For this reason, studies for efficient vertical handover between the 3G network and the WLAN network are actively in progress.

Meanwhile, in case of WiMAX (or WiBro) based on Mobile IPv6, which becomes a main technology for next-generation mobile communication, as a system for broadband wireless Internet access, the cell coverage is wider than WLAN, high mobility is supported, and a large bandwidth is provided, compared with the 3G network. Therefore, with the studies for the efficient vertical handover between the 3G network and the WiMAX (or WiBro), the network resources can be effectively utilized through the vertical handover therebetween.

FIG. 1 is a block diagram of a heterogeneous network system suitable for a vertical handover between WiMAX (or WiBro) and WLAN based on Mobile IPv6, according to a prior art.

The heterogeneous network system shown in FIG. 1 includes: a multi mode terminal (hereinafter, referred to as "MMT") 102 for providing interfaces for WiMAX (or WiBro) and WLAN; a radio access station (hereinafter, referred to as "RAS") 104 for transmitting and receiving radio signals with respect to the multi mode terminal 102 for WiMAX (or WiBro) communication; an access control router (hereinafter, referred to as "ACR") 106 for controlling the radio access station 104; an access point (hereinafter, referred to as "AP") 108 for transmitting and receiving radio signals with respect to the multi mode terminal 102 for WLAN; and an access router (hereinafter, referred to as "AR") 110 for routing radio signals from the access point 108. The network system further includes: a router 112 for selectively routing the radio signals from the access control router 106 or the access router 110; a home agent (hereinafter, referred to as "HA") 114 for managing associated information for WiMAX (or WiBro) and WLAN; and a contents server (hereinafter, also referred to as "correspondent node" or "CN") 116 for providing various contents on the heterogeneous network system.

FIG. 2 is a sequential diagram showing a vertical handover process between WiMAX (or WiBro) and WLAN in the heterogeneous network system of FIG. 1. In this regard, a case where the vertical handover to a WLAN network from a WiMAX (or WiBro) network being serviced currently is performed will be described.

First of all, packets are being transmitted from the CN 116 to the MMI 102 through the WiMAX (or WiBro) network including the RAS 104 and the ACR 106 at step 202.

While receiving the packets, when a WiMAX (or WiBro) interface (not shown) in the MMT 102 notifies an upper layer of a disconnection with the RAS 104 or when a mobile IP module in the MMT 102 does not receive a router advertisement (RA) message any longer, a vertical handover starts. At this time, the MMT 102 activates a WLAN interface at step 204.

Next, the MMT 102 transmits a router solicitation (RtSol) message to the AR 110 through the AP 108 (step 206), and receives a router advertisement (RtAdv) message from the AR 110 that is a reply to the RS message or receive a router advertisement (RtAdv) that is cyclically transmitted from the AR 110 at step 208.

Accordingly, the MMT 102 recognizes a switchover to the WLAN network from the WiMAX (or WiBro) network based on the router advertisement (RtAdv) message, generates a new address (NCoA: New Care of Address) for wireless communication at step 210, and performs a DAD (Duplicate Address Detection) on the new address (NCoA) at step 212. In this regard, it takes several seconds to perform the DAD procedure for confirming whether or not the same addresses exist in the WLAN network.

Next, the MMT 102 transmits a BU (Binding Update) message for establishing a network setup to the HA 114 and the CN 116 at steps 213 and 214, and receives a response (Back) to the BU message from the HA 114 and the CN 116 at steps 215 and 216.

Thereafter, the MMT 102 receives the packets from the CN 116 through the WLAN network, which includes the AP 108 and the access router 110 at step 218.

However, according to the vertical handover method based on the Mobile IPv6 in the above-described network system, it may be difficult to determine a time when the MMT starts the handover. In addition, it may take a lot of time to access a new network, and a handover delay may be caused by time required to receive the router advertisement (RA) message and to perform the DAD procedure through the new network. For this reason, contents may not be provided for the required time. As a result, the vertical handover between different networks, in which the WiMAX (or WiBro) network and the WLAN network are integrated together, may not be smoothly performed.

SUMMARY OF THE INVENTION

It is, therefore, a primary object of the present invention to provide a heterogeneous network system which is capable of smoothly performing a vertical handover based on media independent handover between different network in which WiMAX (or WiBro) and WLAN are coexisted, and a vertical handover method thereof.

It is another object of the present invention to provide a heterogeneous network system which is capable of reducing a time required for a handover delay, and a vertical handover method thereof, thereby providing a seamless contents service in the heterogeneous network system.

In accordance with an aspect of the present invention, there is provided a heterogeneous network system that performs a vertical handover between different networks in which a first network and a second network are coexisted based on a media independent handover, the heterogeneous network system including:

a multi mode terminal for acquiring neighboring network information while performing wireless communication through the first network, generating a new address (NCoA) at a preliminary time of the vertical handover, requesting the second network for DAD (Duplicate Address Detection) of the new address, and transmitting BU (Binding Update) to activate the second network in response to a response to the DAD request, and performing wireless communication through the activated second network;

a media independent handover server for providing the neighboring network information in response to the BU request from the multi mode terminal at a predetermined cycle; and a home agent for performing a switchover from the first network to the second network according to the BU request from the multi mode terminal, and transmitting the switchover result to the multi mode terminal.

In accordance with another aspect of the present invention, there is provided a vertical handover method between different networks in which in which a first network and a second network are coexisted based on a media independent handover, the method including the steps of:

(a) in a multi mode terminal, requesting a media independent handover server for neighboring network information while performing wireless communication through a first network, and receiving the neighboring network information from the media independent handover server;

(b) in the multi mode terminal, generating a new address (NCoA) for wireless communication according to the neighboring network information at a preliminary time of a vertical handover from the first network to the second network;

(c) in the multi mode terminal, requesting the second network for DAD (Duplicate Address Detection) with respect to the generated new address, and receiving a response to the DAD request;

(d) activating the second network according to the response at the step (c);

(e) in the multi mode terminal, transmitting BU (Binding Update) message to a home agent, and receiving a response to the BU message from the home agent; and (f) performing a switchover from the first network to the second network according to the response at the step (e) to thereby perform wireless communication through the second network.

BRIEF DESCRIPTION OF THE DRAWINGS

The above and other objects and features of the present invention will become apparent from the following description of embodiments given in conjunction with the accompanying drawings, in which.

DETAILED DESCRIPTION OF THE INVENTION

Hereinafter, an exemplary embodiment of the present invention will be described in detail with reference to the accompanying drawings.

Figure 1:
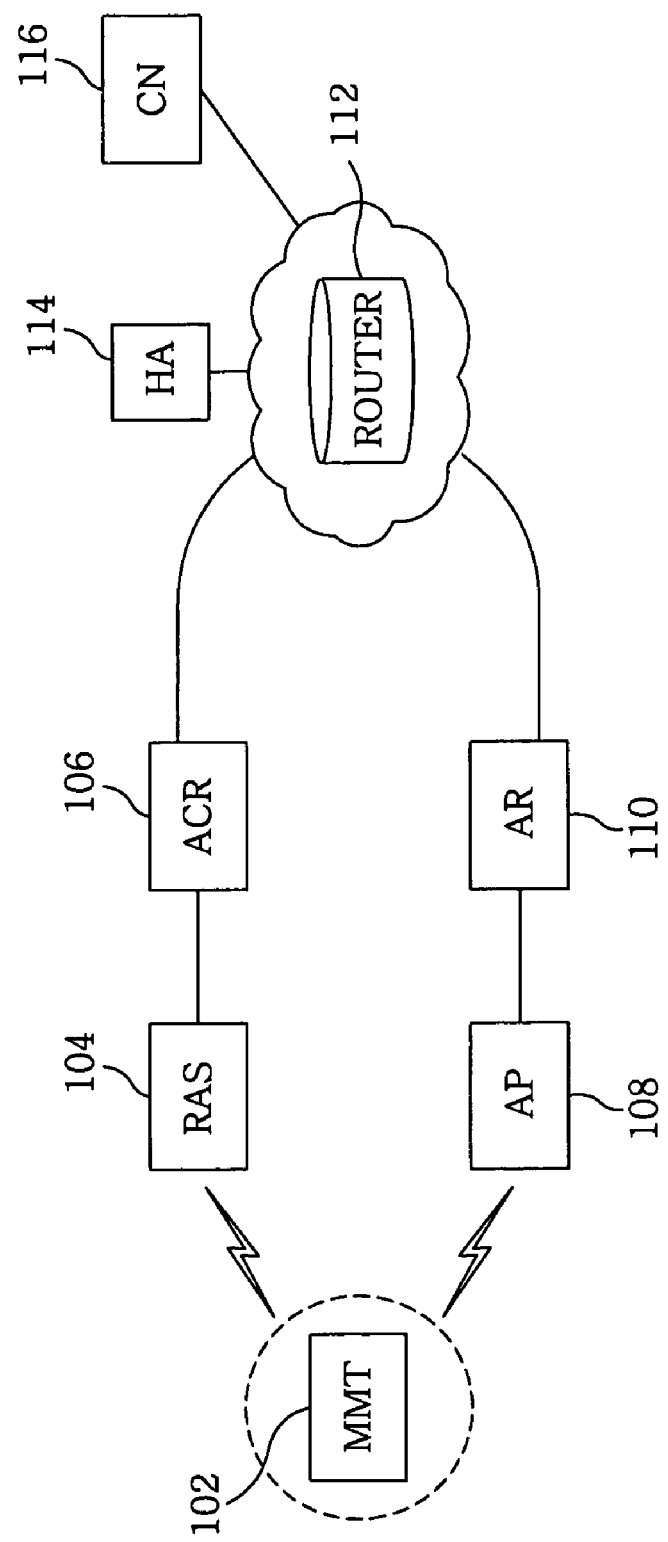
FIG. 1 is an exemplary block diagram of a heterogeneous network system which is suitable for vertical handover between WiMAX (or WiBro) and WLAN based on Mobile IPv6, in accordance with the prior art.
Figure 2:
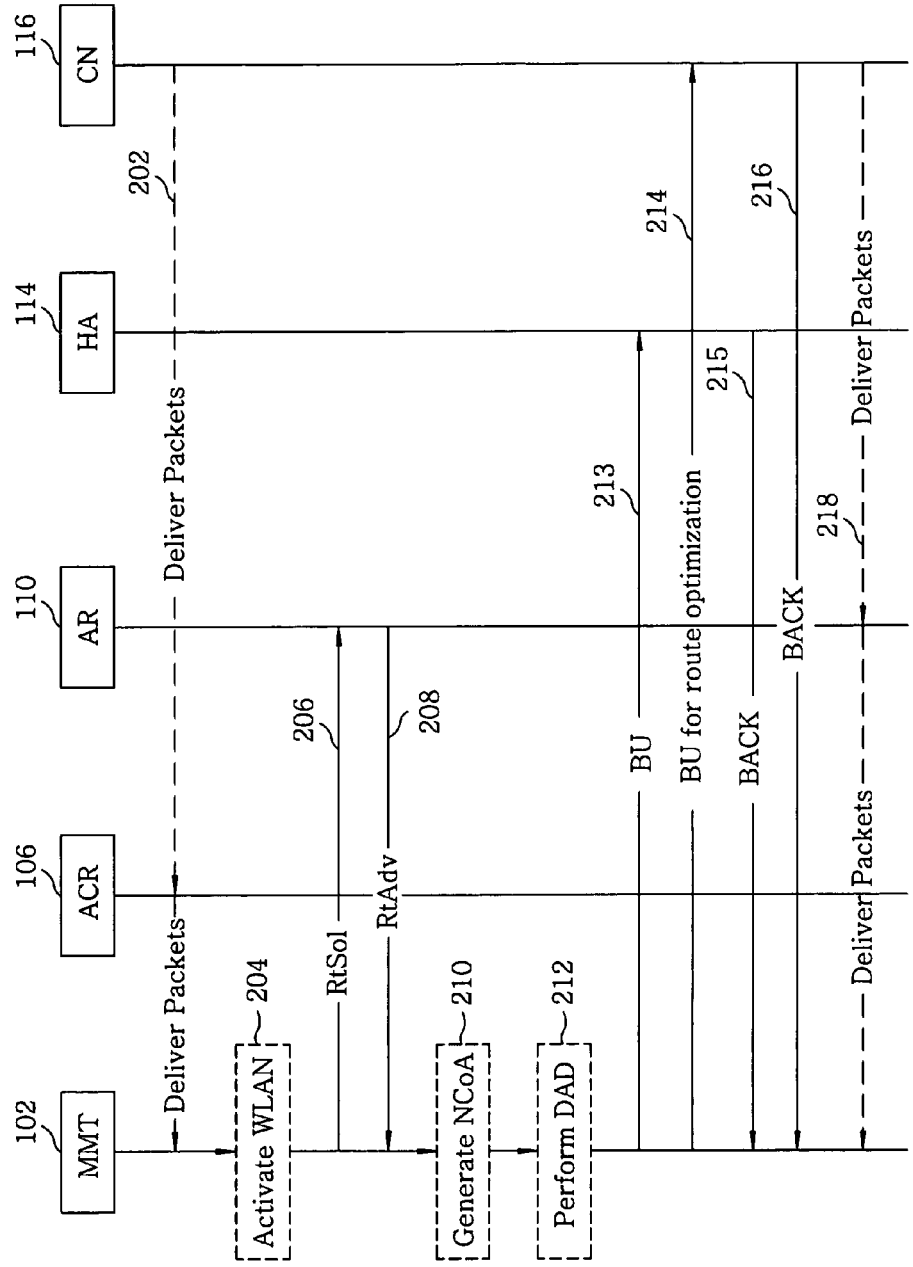
FIG. 2 is a sequential diagram showing a vertical handover process between WiMAX (or WiBro) and WLAN in the heterogeneous network system of FIG. 1.
Figure 3:
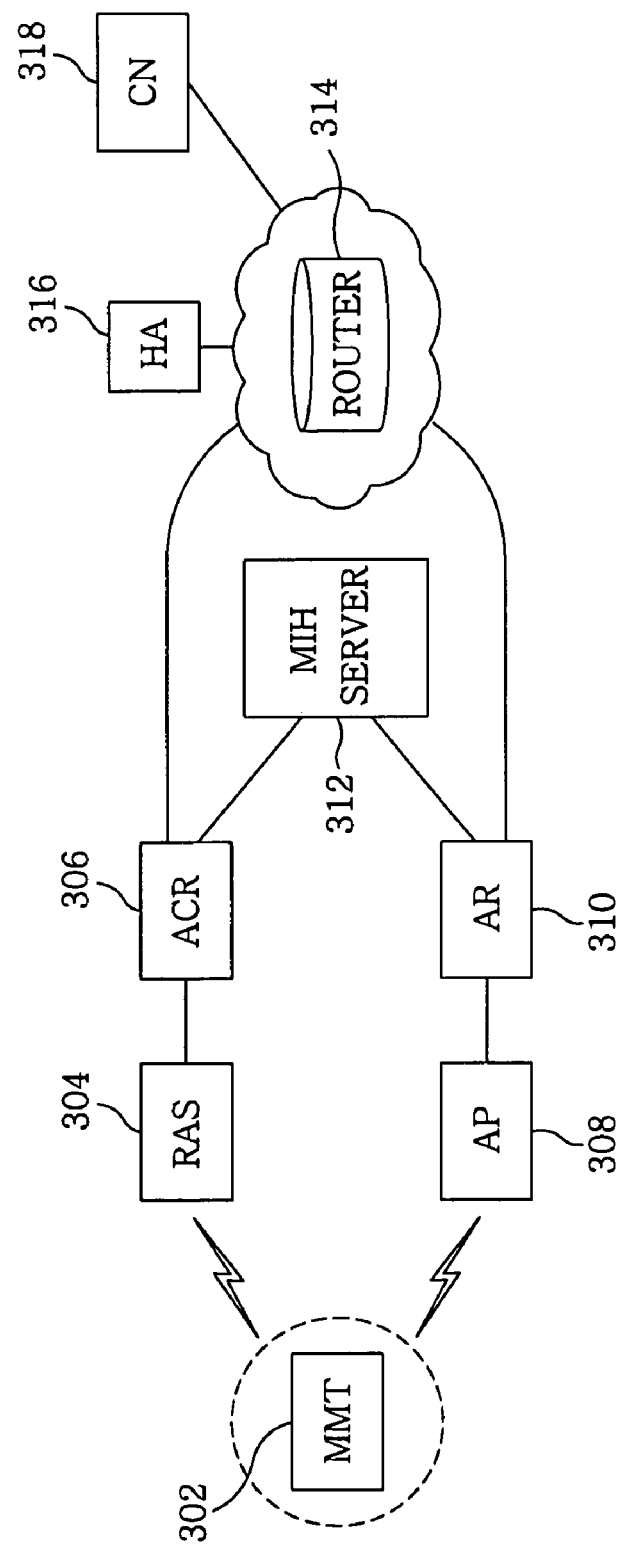
FIG. 3 is an exemplary block diagram of a heterogeneous network system which is suitable for a vertical handover between WiMAX (or WiBro) and WLAN based on media independent handover, in accordance with an embodiment of the invention.

FIG. 3 is a block diagram of a heterogeneous network system which is suitable for a vertical handover between WiMAX (or WiBro) and WLAN based on media independent handover (hereinafter referred to as "MIH" in accordance with an embodiment of the invention.

As shown in FIG. 3, the heterogeneous network system of the invention includes a multi mode terminal (hereinafter, referred to as "MMT") 302, a radio access station (hereinafter, referred to as "RAS") 304, an access control router (hereinafter, referred to as "ACR") 306, an access point (hereinafter, referred to as "AP") 308, an access router (hereinafter, referred to as "AR") 310, a media independent handover server (hereinafter, referred to as "MIHS") 312, a router 314, a home agent (hereinafter, referred to as "HA") 316, and a contents server (hereinafter, also referred to as "correspondent node" or "CN") 318.

Figure 4:
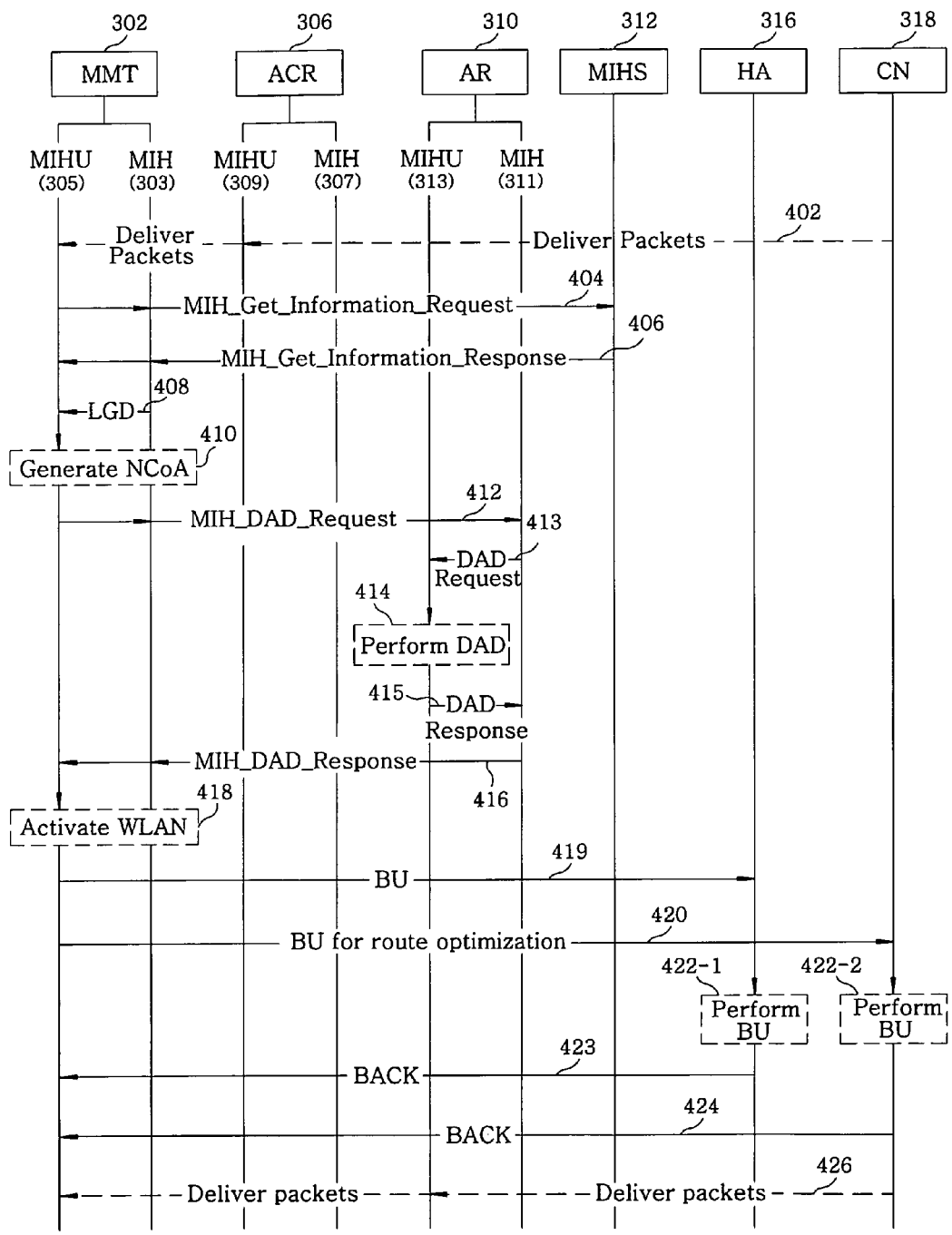
FIG. 4 is a sequential diagram showing a vertical handover process between WiMAX (or WiBro) and WLAN in the heterogeneous network system of FIG. 3 in accordance with an embodiment of the invention.

Furthermore, a MIH protocol is installed in the MMT 302, the ACR 306 and the AR 310. The MIH protocol installed in the MMT 302, the ACR 306 and the AR 310 includes a MIH layer 303; 307; and 311 and a MIH user layer 305; 309 and 313 that controls the MIH layer 303; 307; and 311, respectively, as shown in FIG. 4.

In the following description, it is assumed that a first network refers to, e.g., a WiMAX network of either a WiMAX network or a WiBro network, and a second network refers to a WLAN network. Therefore, the first network includes the RAS 304 and the ACR 306, and the second network includes the AP 308 and the AR 310.

As shown in FIG. 3, the MMT 302 is a terminal that includes a WiMAX interface (not shown) and a WLAN interface (not shown) for wireless communication using different networks, i.e., the WiMAX network and the WLAN network.

The MMT 302 requests the MIHS 312 for information on neighboring network while performing wireless communication through the first network using the WiMAX interface. The MMT 302 receives a reply to the request for the neighboring network information, and generates a new address (NCoA) at a preliminary time of a vertical handover according to the received reply. In addition, the MMT 302 request the second network for a DAD (Duplicate Address Detection) message on the new address, receives a reply to the DAD message, and activates the WLAN interface for wireless communication through the second network according to the received reply. Subsequently, the MMT 302 sends a BU (Binding Update) message to the second network, and performs the wireless communication through the second network according to a reply to the BU message. The BU message, defined in the Mobile IPv6 standard, is to request a change of a packet routing path to a new network.

The MIH layer 303 of the MMT 302 requests the MIHS 312 for the neighboring network information and receives the reply thereto, and the MIH user layer 307 of the MMT 302 controls the MIH layer 303 and receives the neighboring network information to perform operations related to a new address (NCoA) generation, a DAD procedure, and a BU procedure.

More specifically, while the MMT 302 receives packets from the CN 318 through the first network, the MIH user layer 305 of the MMT 302 requests the MIHS 312 for the neighboring network information through the MIH layer 303, and receives the neighboring network information from the MIHS 312. The neighboring network information should be acquired in advance in cyclic communication with the MIHS 312.

If wireless signal strength of the first network under the wireless communication with the first network is smaller than a predetermined strength, the MMT 302 transmits an LGD (Link Going Down) message from the MIH layer 303 to the MIH user layer 305. Then, the MIH user layer 305 generates the new address (NCoA) for wireless communication on the basis of the previously acquired neighboring network information, requests the MIH layer 311 of the AR 310 in the second network for DAD, and receives a reply to the DAD from the AR 310.

The MIH user layer 305 activates the WLAN interface for the second network according to the response to the DAD from the AR 310, and transmits a BU message to the HA 316 and a BU for route optimization to the CN 318 through the second network. As defined in the Mobile IPv6 standard, the BU for route optimization is to request a change of an optimal route from a path of CN-HA-MNT to a path of CN-MNT. Thereafter, the MIH user layer 305 receives responses from the HA 316 and the CN 318, respectively, and then receives the packets from the CN 318 through the second network.

For wireless communication through the first network, the RAS 304 transmits the radio signals generated by the MMT 302 to the ACR 306 or transmits the radio signals provided from the ACR 306 to the MMT 302.

The ACR 306 controls the RAS 304 to transmit the radio signals from the RAS 304 to the HA 316 or the CN 318 through the router 314, or transmits to the RAS 304 the radio signals provided from the HA 316 or the CN 318 through the router 314.

Meanwhile, for wireless communication through the second network, the AP 308 transmits the radio signals generated by the MMT 302 to the AR 310 or transmits the radio signals provided from the AR 310 to the MMT 302.

The AR 310 transmits the radio signals from the AP 308 to the HA 316 or the CN 318 through the router 314 or transmits the radio signals transmitted to the AP 308 from the HA 316 or the CN 318 through the router 314. The AR 310 performs the DAD procedure according to the DAD message from the MMT 302, and then transmits the response to the DAD request to the MMT 302 through the AP 308.

The MIHS 312 is a server that provides an event service, a command service, and an information service such that a session handoff can be appropriately made between different networks or media. The MIHS 312 allows the MMT 302 to select an available optimum network connection type, and when a request for the neighboring network information is made from the MMT 302 at each predetermined cycle, collects the neighboring network information, and provides the MMT 302 with the collected neighboring network information.

The router 314 routs a path for wireless communication through WiMAX or WLAN. To this end, the router 314 transmits the radio signals from the ACR 306 or the AR 310 to the HA 316 or the CN 318, or transmits the radio signals from the HA 316 or the CN 318 to the ACR 306 or the AR 310, respectively.

The HA 316 manages terminal related information for the MMT 302, network information, and the like. When a BU message from the MMT 302 is received, the HA 316 performs BU according to the BU message, and then transmits a response to the BU message to the MMT 302 through the second network.

The CN 318 provides the MMT 302 with contents related to various kinds of media.

When the vertical handover to the second network occurs while the packets are transmitted to the MMT 302 through the first network, the CN 318 performs BU according to the BU message transmitted from the MMT 302, and transmits the response to the BU to the MMT 302 through the second network. Accordingly, the vertical handover from the first network to the second network is performed and the packets from the CN 318 are transmitted to the MMT 302.

In the foregoing description, it has been described that the MIH user layer 313 and the MIH layer 311 of the AR 310 in the first network performs the DAD procedure according to the DAD message from the MMT 302, and transmits the response to the DAD message to the MMT 302 through the AP 308. However, when a vertical handover from the second network to the first network occurs, the MIH user layer 309 and the MIH layer 307 of the ACR 306 in the second network will perform the DAD procedure according to the DAD message from the MMT 302 and will then transmit the response to the DAD message to the MMT 302 through the RAS 304.

Next, a process for a vertical handover to a WLAN network during wireless communication through a WiMAX network in the heterogeneous network system having the above-described configuration will be described.

FIG. 4 is a sequential diagram showing a vertical handover process between a WiMAX network and a WLAN network based on media independent handover in the heterogeneous network system of FIG. 3.

First, for wireless communication between the MMT 302 and the CN 318, the packets, which are transmitted from the CN 318 through the first network, that is, the WiMAX network, are received by the MIH user layer 305 of the MMT 302 at step 402.

While receiving the packets, the MIH user layer 305 of the MMT 302 cyclically requests the MIHS 312 for neighboring network information on MIH_Get_Information REQUEST through the MIH layer 303 at step 404.

The MIHS 312 then transmits a response of the neighboring network information on MIH_Get_Information RESPONSE to the MIH layer of the MMT 302 and then the MIH user layer 305 in accordance with the request at step 406. Accordingly, the neighboring network information is cyclically acquired by the MMT 302 in advance.

In the MMT 302, thereafter, if the signal strength of the first network under wireless communication is smaller than the predetermined signal strength, an LGD (Link Going Down) message is transmitted from the MIH layer 303 to the MIH user layer 305 at step 408. The time at which the LGD message is transmitted represents the handover preliminary time for the vertical handover to the second network from the first network.

Next, the MIH user layer 305 generates a new address (NCoA) for wireless communication through the second network on the basis of the previously acquired neighboring network information at step 410, and the MIH user layer 305 then transmits a DAD request on MIH_DAD REQUEST to the MIH layer 311 of the AR 310 in the second network through the AP 308 at step 412.

After that, the MIH layer 311 relays the DAD request to the MIH user layer 313 at step 413.

Subsequently, the MIH user layer 313 performs a DAD procedure at step 414 and transmits a DAD response to the MIH layer 311 at step 415.

The MIH layer 311 then transmits a DAD response on MIH_DAD RESPONSE to the MIH layer 303 and then the MIH user layer 305 through the AP 308 at step 416.

Subsequently, the MIH user layer 305 activates the WLAN interface for the second network according to the DAD reply at step 418, and then transmits a BU (Binding Update) message and a BU message for route optimization to the HA 316 and the CN 318 through the second network, respectively, at steps 419 and 420.

In response thereto, each of the HA 316 and the CN 318 performs BU (that is, a network setup) at steps 422-1 and 422-2, and transmits a response on a BAck message to the MIH user layer 305 through the second network at steps 423 and 424.

After that, the MIH user layer 305 receives packets from the CN 318 through the second network in which the network setup is successful, that is, through the AP 308 and the MIH user layer 313 of the AR 310 at step 426.

In the foregoing embodiment, it has been described that a vertical handover is performed from the first network to the second network, that is, from the WiMAX (or WiBro) network to the WLAN network. To the contrary, however, it will be recognized to those skilled in the art that a vertical handover from the second network to the first network, that is, from the WLAN network to the WiMAX (or WiBro) network can be performed. In this case, the DAD procedure will be performed in the MIH user layer 309 and the MIH layer 307 of ACR 306, and the DAD response will be transmitted to the MMT 302 through the RAS 304.

As described above, in the heterogeneous network system that integrates the WiMAX (or WiBro) and the WLAN networks, neighboring network information is cyclically acquired in advance through the media independent handover server and new address (NCoA) generation is performed at a handover preliminary time. And then DAD (Duplicate Address Detection) and BU (Binding Update) are performed in sequence. As a result, a vertical handover between different networks can be performed to receive packets from a switched network while a handover delay time is minimized.

While the present invention has been described with respect to certain preferred embodiments, it will be apparent to those skilled in the art that various changes and modifications may be made without departing from the scope of the present invention as defined in the following claims.

What is claimed is:

1. A heterogeneous network system that performs a vertical handover between different networks in which a first network and a second network are coexisted based on a media independent handover, the heterogeneous network system comprising:
    a multi mode terminal for acquiring neighboring network information while performing wireless communication through the first network, generating a new address (NCoA) at a preliminary time of the vertical handover, requesting the second network for DAD (Duplicate Address Detection) of the new address, and transmitting BU (Binding Update) to activate the second network in response to a response to the DAD request, and performing wireless communication through the activated second network, wherein the preliminary time of vertical handover is a time at which a signal strength in the first network, on which the multi mode terminal currently performs wireless communication, is smaller than a predetermined signal strength;
    a media independent handover server for providing the neighboring network information in response to the BU request from the multi mode terminal at a predetermined cycle; and
    a home agent for performing a switchover from the first network to the second network according to the BU request from the multi mode terminal, and transmitting a switchover result to the multi mode terminal;
    wherein the multi mode terminal includes a MIH layer for transmitting an LGD (Link Going Down) message at the preliminary time of the vertical handover, and a MIH user layer for performing operations related to the generation of the new address, DAD, and BU in response to the LGD message.

2. The heterogeneous network system of claim 1, wherein the MIH layer requests the media independent handover server for the neighboring network information and receives a response to the request, and wherein the MIH user layer controls the MIH layer and receives the neighboring network information.

3. A vertical handover method between different networks in which in which a first network and a second network are coexisted based on a media independent handover, the method comprising the steps of:
    (a) in a multi mode terminal, requesting a media independent handover server for neighboring network information while performing wireless communication through a first network, and receiving the neighboring network information from the media independent handover server, wherein the request of the neighboring network information is made by a MIH user layer of the multi mode terminal, and sending an LGD (Link Going Down) message from a MIH layer of the multi mode terminal to the MIH user layer of the multi mode terminal at a preliminary time of a vertical handover, wherein the preliminary time of a vertical handover is a time at which a signal strength in the first network, on which the multi mode terminal currently performs wireless communication, is smaller than a predetermined signal strength;
    (b) in the multi mode terminal, generating a new address (NCoA) for wireless communication according to the neighboring network information at the preliminary time of a vertical handover from the first network to the second network, wherein the new address is generated by the MIH user layer of the multi mode terminal;

(c) in the multi mode terminal, requesting the second network for DAD (Duplicate Address Detection) with respect to the generated new address, and receiving a response to the DAD request;

(d) activating the second network according to the response at the step (c);

(e) in the multi mode terminal, transmitting BU (Binding Update) message to a home agent, and receiving a response to the BU message from the home agent; and (f) performing a switchover from the first network to the second network according to the response at the step (e) to thereby perform wireless communication through the second network.

4. The vertical handover method of claim 3, wherein the step (f) includes the steps of:

transmitting the BU message to the home agent and receiving the response to the BU message from the home agent; and transmitting the BU message to a corresponding node for providing packets, and receiving a response to the BU message from the corresponding node.

* * * * *